United States Patent [19]

Fujii et al.

[11] Patent Number: 4,491,556

[45] Date of Patent: Jan. 1, 1985

[54] PROCESS AND MOLD UNIT FOR PRODUCING CARPET MAT

[75] Inventors: Hiromasa Fujii; Hisakazu Matsui, both of Hiroshima, Japan

[73] Assignee: Hiroshima Kasei, Ltd., Hiroshima, Japan

[21] Appl. No.: 484,514

[22] Filed: Apr. 13, 1983

[30] Foreign Application Priority Data

Nov. 13, 1982 [JP] Japan ............................. 57-199270

[51] Int. Cl.³ ........................... B29C 5/00; B29F 1/10
[52] U.S. Cl. ..................................... 264/243; 249/95; 249/117; 264/257; 264/271.1; 264/279; 425/127; 425/129 R; 425/543
[58] Field of Search .................. 264/45.1, 259, 257, 264/243, 279, 271.1; 428/88, 95; 249/83, 95, 117; 425/127, 129 R, 543

[56] References Cited

U.S. PATENT DOCUMENTS

| | | | |
|---|---|---|---|
| 1,939,293 | 12/1933 | Cavanaugh et al. | 264/257 |
| 2,054,499 | 9/1936 | Florman | 264/257 |
| 2,104,941 | 1/1938 | Baynton et al. | 428/88 |
| 3,755,031 | 8/1973 | Hoffman et al. | 264/257 |
| 3,956,551 | 5/1976 | Richards | 428/88 |
| 4,377,610 | 3/1983 | McClung | 428/88 |
| 4,381,324 | 4/1983 | Ellingson | 428/55 |
| 4,418,031 | 11/1983 | Doerer et al. | 264/257 |

FOREIGN PATENT DOCUMENTS 1410645 10/1975 United Kingdom ............... 264/45.1

*Primary Examiner*—Willard E. Hoag
*Attorney, Agent, or Firm*—Browdy and Neimark

[57] ABSTRACT

A process and an apparatus are, herein, disclosed for producing a carpet mat with an injection mold unit composed of two molds, a first mold having a carpet-accommodating cavity formed parallel to the parting line, a plurality of grooves being provided at a given interval in the part of a second mold corresponding to said carpet-accommodating cavity, at least one of the two molds having a cavity to form the edges of a mat base, said process comprising confining a carpet in said carpet-accommodating cavity, injecting a thermoplastic resin into the space between said carpet and the grooves to form a mat base which is simultaneously joined to the carpet.

4 Claims, 17 Drawing Figures

PROCESS AND MOLD UNIT FOR PRODUCING CARPET MAT

FIELD OF THE INVENTION

The present invention relates to a new process and mold unit for producing a carpet mat.

BACKGROUND OF THE INVENTION

Most carpet mats are made up of two elements, one being a mat base with edges and a carpet-receiving part molded from a thermoplastic resin and the other being a needle-punched or tufted carpet bonded to the mat base with an adhesive. Carpet mats find much use as floor mats in cars, bath mats, throw rugs, etc.

In conventional carpet mat making, a mat base is first made from a resin by injection molding, press molding or casting molding, then a carpet section cut to the shape and size of the base is prepared, an adhesive is applied to one or both mating surfaces, and the base and carpet are put into registry and are bonded together. But this method is not ideal for assuring high bond strength at low cost. For instance, a car floor mat is nearly as large as one square meter and requires much adhesive to bond the mat base and carpet. Adhesive application and bonding operations are necessary after fabrication of each mat base, and the cost of the adhesive and its application accounts for the greater part of the overall cost of the carpet mat. Furthermore, this method requires a huge initial cost since it involves an applicator, dryer, conveyor and a press, as well as a work shop for application and bonding operations and a warehouse to put in mat bases before bonding operations. Applying the right amount of adhesive without fouling the edges of the mat base and bonding it to the carpet in registry requires highly skilled personnel. Most adhesives deteriorate due to heat or moisture and will not exhibit high adhesion strength over an extended period. Another factor that reduces the bonding strength of the adhesive is the uneven surface of the back side of the carpet that leaves a gap between the mating surfaces. For these reasons, the strength of the bond formed between the mat base and carpet by an adhesive is smaller than that achieved by fusion of the resin of which the mat base is made. A cross-section of the conventional mat base is shown in FIG. 1; the base consists of edges 1 which are integral with an inner carpet-receiving part 2. The edges 1 have sufficient height in order to provide good appearance, to retain the necessary strength in service and to prevent fraying, whereas the carpet-receiving part 2 is usually 1 to 2 mm thick and greater thickness is not necessary for practical purposes. The recent demand for lighter cars is another factor which necessitates the use of a thinner carpet-receiving part. FIG. 2 is a partial cross-section of a finished carpet mat, wherein the carpet 4 is bonded to the mat base through an adhesive layer 3. A cross-section of a typical injection mold unit for use in making the mat base is shown in FIG. 3; the unit consists of an upper mold 5 and a lower mold 6 with a cavity engraved in the upper mold to the size and shape of the mat base and connected to a sprue 7. A resin melted in a heating cylinder is pressed into the mold unit through the sprue 7 and fills the cavity 8. Upon cooling, the resin solidifies and can be recovered as a mat base.

For the purposes of describing the present invention in this specification, that part of the mold unit above the parting line when it is set in an injection molding machine as shown in FIG. 3 is called an "upper mold" and the part positioned below that parting line is called a "lower mold." However, these terms are not completely established in the art, and depending on the type of injection molding machines, the two molds may be positioned vertically, or the "upper mold" may be positioned under the "lower mold." With a view to developing a process for producing a carpet mat by joining a mat base to a carpet simultaneously with the making of the former by injection molding, we started by adding to the conventional mold unit of FIG. 3 a cavity made in the upper mold to accommodate a carpet. As a result of various studies that were based on this idea, we have come up with a new mold system that satisfies our object.

SUMMARY OF THE INVENTION

Therefore, an object of the present invention is to provide a process for producing a carpet mat by joining a mat base to a carpet simultaneously with the making of the former by injection molding.

Another object of the present invention is to provide a new mold system with which a carpet mat can be produced by joining a mat base to a carpet simultaneously with the making of the former by injection molding.

DETAILED DESCRIPTION OF THE INVENTION

Figure 3:
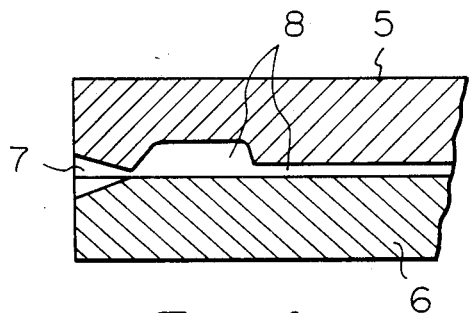
FIG. 3 is a partial cross-section of a representative conventional mold unit for producing a mat base.
Figure 4:
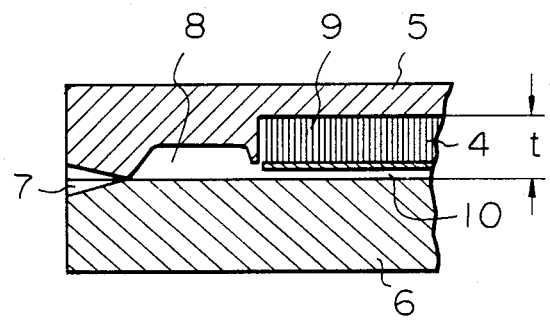
FIG. 4 is a partial cross-section of a mold unit that we fabricated as a trial before accomplishing the mold unit of the present invention.
Figure 5:
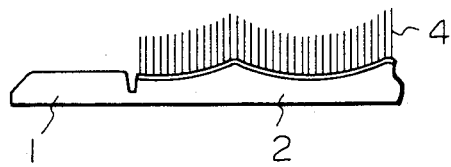
FIGS. 5 and 6 show in partial cross-section the carpet mats produced with the mold unit of FIG. 4.
Figure 6:

In the course of our research project that led to the accomplishment of the present invention, we made an attempt to fabricate a carpet mat using a mold unit having the construction shown in FIG. 4 which is similar to the mold system of FIG. 3 except that it has another cavity 9 for accommodating a carpet. In FIG. 4, the cavity 9 is filled with a carpet 4. According to our expectation, when a molten resin was pressed into the mold unit through sprue 7, it would flow through gap 10 between the carpet 4 and lower mold 6 and would join with the back side of the carpet 4 either by fusion or by the "anchor effect," thereby providing a finished carpet mat that has the carpet joined to the mat base simultaneously with its making by injection molding. But as it turned out, the carpet became so thin under the pressure of the injected resin that the carpet-receiving part 2 of the resulting mat base was impractically thick. As a further defect, the area of the carpet-receiving part 2 near the sprue 7 differed greatly in thickness from the area far from the sprue. A carpet mat produced with the mold unit of FIG. 4 is shown in the cross-section of FIG. 5. We then made another test by reducing the depth t of the cavity 9 to the thickness of the carpet that has been compressed to the fullest extent. However this time, the carpet occupied the whole space of the cavity 9 and prevented resin flow toward the back side of the carpet, and as a result, no carpet-receiving part 2 was formed. We repeated the same experiment using various values for the depth of the cavity 9, but the result was more or less the same, and no product having a uniformly thin carpet-receiving part 2 could be produced. A carpet mat produced by the above described mold unit is shown in cross-section in FIG. 6. Based on close analysis of the disadvantages of these products, we continued our studies on the construction of a mold unit suitable for making a seemly and handy-to-use carpet mat, and have finally reached the present invention.

Figure 7:
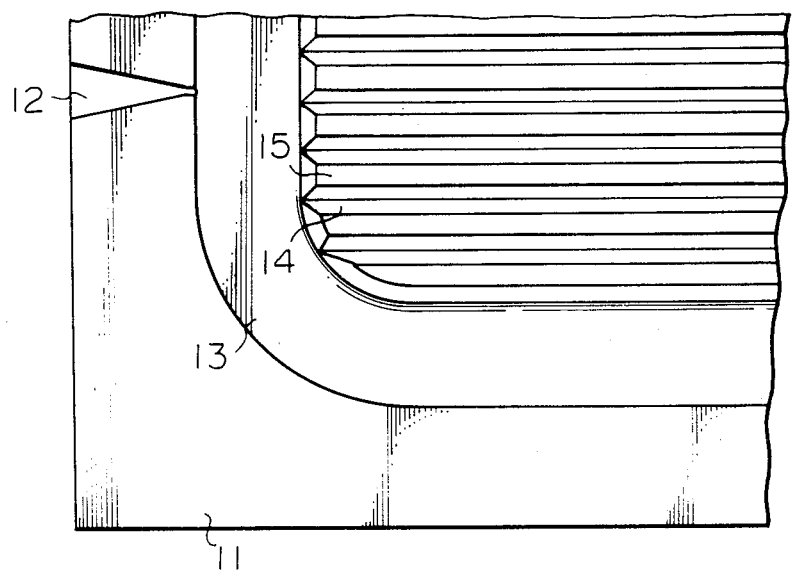
FIG. 7 is a partial plan view of the lower mold of the mold unit according to one embodiment of the present invention.
Figure 8:
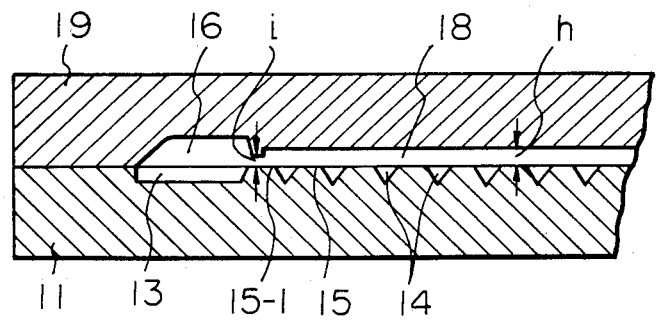
FIG. 8 is a partial cross-section of the mold unit of FIG. 7.

FIG. 7 is a partial plan view of the lower mold 11 of the injection mold unit of the present invention according to one embodiment, and FIG. 8 is a partial cross-section of the upper and lower molds. The basic elements of the mold system provided by the present invention are two oppositely facing molds 11 and 19. One mold 19 has a carpet-accommodating cavity 18 formed parallel to the parting line, and in the part of the other mold 11 corresponding to the cavity 18, a plurality of grooves 14 are provided, with ridges 15 formed therebetween. While the mold unit of the present invention has this basic structure, it should be understood that various changes and modifications may be made to this structure, as described hereunder.

The depth h of the carpet-accommodating cavity 18 is generally equal to the thickness of the carpet that is fully compressed, but it may be a little deeper and the exact value should be determined empirically depending on the type of the carpet to be used. When a molten thermoplastic resin is injected into the mold unit with the cavity 18 being filled with a relatively soft carpet, it sometimes occurs that the resin partially displaces the carpet and goes into the cavity 18 and makes the fabrication of a carpet mat with the desired shape impossible. Therefore, when a soft carpet is used, the periphery of the cavity 18 is perferably provided with a downwardly extending lip 17 to prevent the molten resin from entering the cavity 18. The length of the lip varies with the thickness of the carpet, so the gap i between the lowest end of the lip and the surface of a ridge 15-1 just below that lip is properly determined according to such factors as the type of resin used and the rate of injection of the molten resin. Therefore, one important feature of the present invention is that the outer periphery of the carpet confined in the cavity 18 is tightly held and fixed between the lip 17 and the ridge 15-1, and that this prevents the molten resin from overflowing the edge-forming cavity 16 and entering the carpet-accommodating cavity 18.

Figure 1:
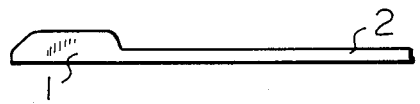
FIG. 1 is a partial cross-section of the conventional mat base.
Figure 2:
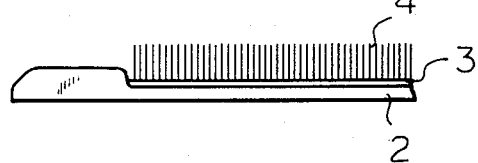
FIG. 2 is a partial cross-section of the conventional carpet made of a mat base to which a carpet is bonded by an adhesive.

As shown in FIG. 1, most carpet mats are provided with edges 1 to improve their appearance, increase their strength in service and prevent fraying, so the mold unit of the present invention preferably has a cavity around the lip 17 to form the edges of a carpet mat. In FIG. 8 that shows a cross-section of the mold unit of the present invention according to one embodiment, upper mold 19 and lower mold 11 respectively have edge-forming cavities 16 and 13, but this is not essential for the purposes of the present invention and either the upper or lower mold may have an edge-forming cavity. If only the upper mold has an edge-forming cavity, grooves are preferably provided in the corresponding area of the lower mold to provide a smooth flow of the molten resin.

The grooves 14 are formed in the lower mold of the mold unit of the present invention to prevent slippage of the carpet mat, so their shape is properly determined depending upon the physical properties of the resin used and the general conditions for injection molding. In the embodiment of FIG. 8, the grooves have a triangular cross-section, but other shapes may be used, and rectangular and circular cross-sections may be selected with advantage.

In the most preferred embodiment, the present invention provides a mold unit for fabrication of a carpet mat which consists of a first mold having a carpet-accommodating cavity and a second mold having a plurality of grooves in the area corresponding to said carpet accommodating cavity in the first mold, the periphery of said carpet-accommodating cavity in the first mold being provided with a lip to restrict the flow of a molten resin, a cavity to form the edges of the carpet mat being formed around said lip, the rear of the second mold with said grooves being surrounded by a cavity that corresponds to the edge-forming cavity in the first mold and which is substantially equal in depth to said grooves.

While primary changes or modifications to the mold unit of the present invention as well as the most preferred embodiment thereof are described in the foregoing, the specific design of the mold unit of the present invention should be properly determined in consideration of the molding machine used, the properties of the resin used, the shape of the molded article and the general molding conditions.

Two typical methods for producing a carpet mat with the mold unit of the present invention are described hereunder.

Production of a carpet mat having a row of ridges on the underside

Figure 9:
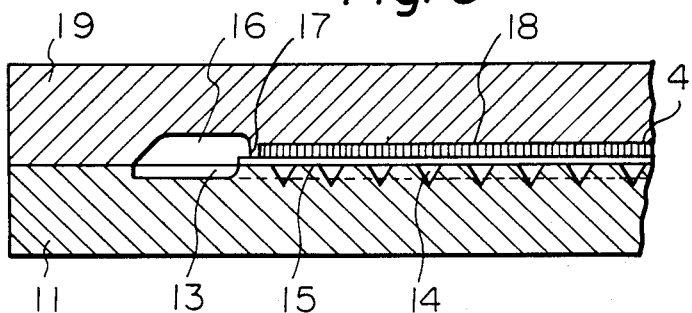
FIG. 9 is a partial cross-section that illustrates the mold unit of FIG. 8 with a carpet filled therein.
Figure 10:
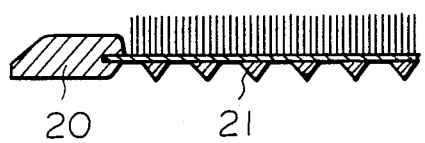
FIGS. 10 and 11 show in partial cross-section two carpet mats produced with the mold unit of FIG. 8.

FIG. 9 shows in cross-section the mold unit of the present invention having a carpet 4 of predetermined size and shape accommodated in cavity 18. The depth h of the cavity 18 is equal to the thickness of the carpet that has been compressed to the fullest, so when the mold unit is closed, the carpet is compressed by the walls of the cavity 18 and brought into close contact with ridges 15 on the lower mold 11. Since the size of the carpet is slightly larger than that of the cavity 18, its periphery is securely held between the lip 17 and ridge 15-1 positioned right beneath. The gap i between the lip and ridge 15-1 is even smaller than the depth h of the cavity 18 and the head of the lip is small, the carpet 4 is tightly held between the lip and ridge 15-1 to prevent a molten resin from overflowing the carpet edge forming cavity 16 and entering the cavity 18. When the molten resin is injected into the mold unit through sprue 12 (FIG. 7), it fills sequentially the edge-forming cavities 16, 13 and grooves 14. The carpet 4 is held tightly against the ridges 15, so that the molten resin will not flow into the carpet-filled cavity 18, and instead, will fill the vacant space of each groove 14 and will be either fused or "anchored" to the fibers on the back side of the carpet. By subsequently cooling the resin, a carpet mat having the edges and carpet receiving part of the mat base joined to the carpet simultaneously with the molding of the base is obtained. As shown in FIG. 10 in cross-section, this carpet mat has a row of resin ridges 21 on the underside.

Most carpet mats are provided with resin edges and a carpet-receiving part to improve their appearance and strength and prevent the fraying of the carpet, and without these parts, the carpet is flabby and easily rucked up. According to the present invention, the ridges 21 may be formed on the bottom of the mold unit either longitudinally or transversally or in lattice form, and the width, height and shape of each ridge as well as the interval of the ridges can be freely determined, so the functions of the ridges to increase the strength of the carpet and prevent it from getting rucked up are fully achieved. By forming a lattice of closely arranged ridges in the center of the mat base and surrounding them with a longitudinal row of coarsely arranged ridges, a carpet mat that is hard in the center but soft in the surrounding area can be produced, and this is ideal as a car floor mat because it easily follows the contour of the car floor and will not get rucked up during service.

Figure 11:
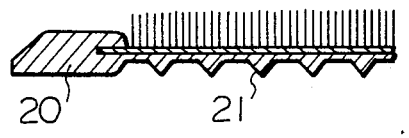

FIG. 11 is a cross-section of the carpet mat molded from a mold unit having a deeper cavity 18 than the mold unit used to make the carpet mat of FIG. 10. Since the depth h is relatively large, the carpet 4 is not held against the ridges 15 as tightly as in the mold unit of FIG. 9, and when the injected molten resin flows through the grooves 14, it pushes up the carpet 4 to form some space above the ridges 15, and this space is also filled with the resin. This phenomenon was described in the earlier part of this specification by reference to FIGS. 5 and 6; if the carpet 4 is highly compressed, only a small amount of the resin leaks into the space between the carpet and the ridges 15 and a thin and small resin layer is formed, but if the carpet is lightly compressed, an appreciable resin leak occurs and a thick and large resin layer is formed. Therefore, by properly controlling the compression of the carpet, namely, by proper adjustment of the depth h of the cavity 18 and the interval of the grooves 14, a carpet mat having the carpet connected to the ridges 15 by thin resin layers (i.e. the bottom of the carpet mat is made from the resin throughout) can be produced. One great advantage of this solid resin layer is that it makes the bottom of the carpet mat resistant to water. The resin ridges 21 on the bottom provide a great friction with the floor on which the carpet mat is placed and prevents slippage effectively.

Production of a carpet mat having single-standing projections on the underside

Figure 12:
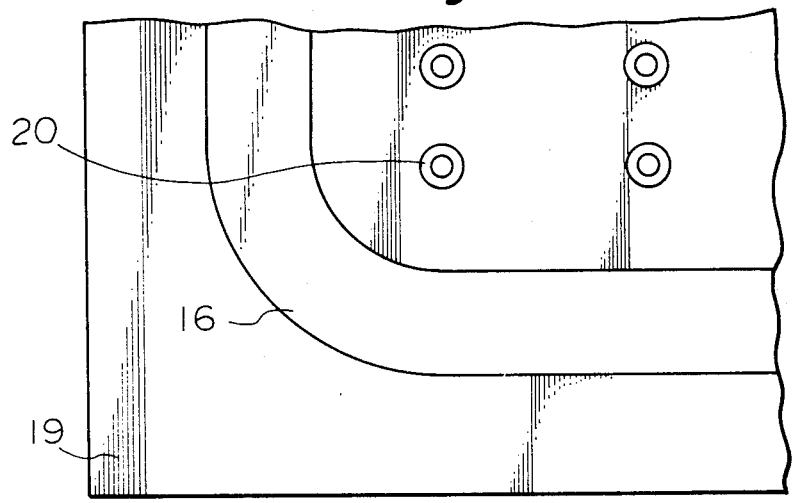
FIG. 12 is a partial plan view of the upper mold of the mold unit according to another embodiment of the present invention.
Figure 13:
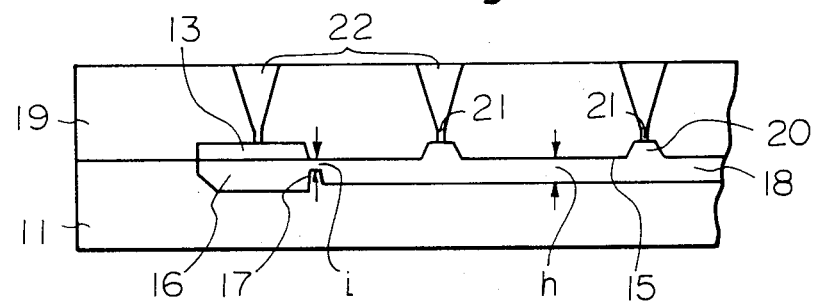
FIG. 13 is a partial cross-section of FIG. 12.
Figure 15:
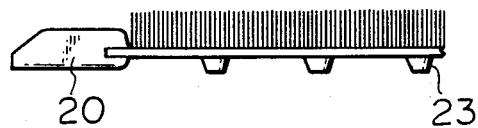
FIGS. 15 and 16 show in partial cross-section two carpet mats produced with the mold unit of FIG. 12.
Figure 16:
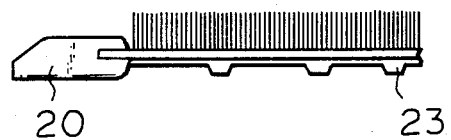
Figure 17:
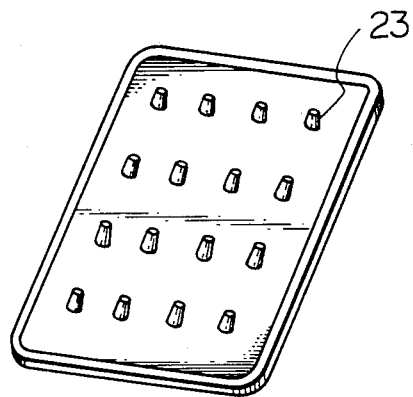
FIG. 17 shows the back side of the carpet mats of FIGS. 15 and 16.

The mold unit of the present invention can also be used to produce a carpet mat having single-standing projections on the bottom as shown in FIGS. 15, 16 and 17. An example of the mold unit used to produce this type of carpet mat is illustrated in FIGS. 12 and 13; the unit consists of an upper mold 19 having sprues 22 and gates 21 connected to respective cavities 20 as well as an edge-forming cavity 13 formed in the area corresponding to a mat base, and a lower mold 11 having a carpet-accommodating cavity 18 surrounded by a lip 17 to prevent the entrance of a molten resin into the cavity 18, as well as an edge-forming cavity 16. The depth of the carpet-accommodating cavity 18 is indicated by h and the clearance between the lip 17 and the upper mold 19 with cavities 20 is represented by i, and the advantage resulting from controlling these parameters is the same as that described in connection with the production of a carpet having a row of ridges on the underside.

Figure 14:
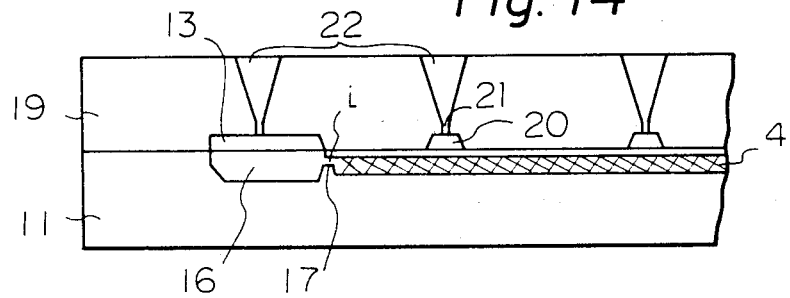
FIG. 14 is a partial cross-section of the mold unit of FIG. 12 with a carpet filled therein.

FIG. 14 is a cross-section that illustrates the mold unit of FIG. 13 with a carpet 4 of predetermined size and shape confined in the carpet-accommodating cavity 18. The depth h of the cavity 18 is equal to the thickness of the carpet that has been compressed to the extreme end, so when the mold unit is closed, the carpet is compressed by the walls of the cavity 18 to be brought into close contact with ridges 15 on the lower mold 11. Since the size of the carpet is slightly larger than that of the cavity 18, its periphery is securely held between the lip 17 and the part of the upper mold 19 right above. The gap i between the lip 17 and the upper mold 19 is even smaller than the depth h of the cavity 18 and the head of the lip is small, so the carpet 4 is held tightly between the lip and the upper mold 19 to prevent a molten resin from overflowing the edge-forming cavity 16 and entering the cavity 18. When the molten resin is injected into the mold unit through sprues 22, it runs through gates 21 and fills cavities 20, as well as edge-forming cavities 13 and 16. The carpet 4 is held tightly against lands 15 between cavities 20, so the resin will not flow into the carpet-filled cavity 18. Furthermore, the periphery of the carpet is held securely in position by the lip 17, so it will not be creased or rucked up at all when the resin is injected into the mold unit. The resin is either fused or "anchored" to the fibers on the back side of the carpet, and by subsequently cooling the resin, a carpet mat having the edges and carpet-receiving part of the mat base joined to the carpet simultaneously with the molding of the base is obtained. As shown in FIG. 15 in cross-section, this carpet mat has single-standing projections 23 on the bottom.

According to the present invention, a carpet mat having its bottom entirely covered with a resin layer and resinous projections 23 as shown in FIG. 16 may also be fabricated. For this purpose, the depth h of the carpet-accommodating cavity 18 is made larger than that used for the mold unit of FIG. 13; when a molten resin is injected through sprues 22 and gates 21, it fills cavities 20 and presses the carpet 4 downwardly, whereupon some space is formed between the carpet 4 and lands 15 and the molten resin flows into that space to form a resin layer on the back side of the carpet.

In designing the mold unit of the present invention, the positions and number of sprues 22 and gates 21 are determined by those of the projections 23. The diameters and shape of the sprues 22 and gates 21 are empirically determined depending upon the shape and capacity of cavities 20. For producing a carpet mat having single-standing projections on the bottom, cavities 20 must communicate with sprues 22 and gates 21. In FIGS. 15 to 17, the projections 23 are conical, but a carpet mat having projections in the form of triangular or quadrangular pyramids can be easily produced by the mold unit of the present invention.

The present invention enables the thus far impossible molding of a carpet mat having single-standing projections on the bottom, and the projections can take on any form that improves the appearance of the back side of the mat, any gives it the ability to follow the contour of the floor on which it is placed, and prevents the slippage of the mat.

According to another embodiment of the present invention, a mat base may be injection-molded from a thermoplastic resin after inserting a different inexpensive resin film on the underside of a carpet placed between the upper mold 19 and lower mold 11. By so doing, a carpet mat having a seemly obverse surface and a reverse face made of the inexpensive resin can be fabricated.

As will be apparent from the foregoing description, the process of the present invention entirely eliminates the need of bonding a carpet to a mat base, and a carpet mat can be produced without the cost of adhesives and bonding operations and with great reduction in the initial cost. The product is as good as the conventional product in respect of appearance, strength and the ability to prevent the fraying and the rucking-up of the carpet. As further advantages, the resin of which the mat base is made is fused to the carpet to provide increased adhesion strength, and the carpet mat easily follows the contour of the floor on which it is placed while still retaining great anti-slip properties. Examples of the thermoplastic resin that can be used in the present invention are flexible resins such as polyvinyl chloride resin, ethlenevinyl acetate copolymer, butadiene rubber, epoxy resin and thio rubber, and polyethylene resin, polypropylene resin, and mixtures thereof. The carpet that is used in the present invention may be made of any material such as polyethylene terephthalate fibers and cotton fibers, and it can be made from needle-punched carpet or tufted carpet. The back side of the mat may be fitted with a resin or fabric packing, or it may be treated with a chemical for bonding to the floor on which it is spread

What is claimed is:

1. A process for injection molding an edged carpet mat base and bonding the base to carpet in situ in the mold, comprising:
    (a) providing an injection mold unit having first and second mating molds defining a carpet-accommodating cavity for receiving a carpet; an edge-forming cavity for receiving liquid resin to form the mat edge surrounding the carpet-accommodating cavity and divided therefrom by a peripheral ridge extending between the cavities preventing liquid resin within the edge-forming cavity from entering the carpet-accommodating cavity; and a plurality of grooves for receiving liquid resin to form the mat base extending between opposite sides of the edge-forming cavity along the carpet accommodating cavity;
    (b) placing a carpet within the carpet-accommodating cavity so that the carpet is retained in position within the mold unit by the lands of the grooves and the projecting ridge pressing the carpet against the corresponding mating mold;
    (c) injecting sufficient molten resin into the edge-forming cavity to fill this cavity and flow into the grooves; and
    (d) curing the resin to form a solid edged mat base comprising an edged resin layer with integral ridges bonded to the carpet 2. The process of claim 1, wherein the lands lightly compress the carpet so that a thick resin layer with integral ridges is formed on the underside of the carpet.

3. The process of claim 1, wherein the lands tightly compress the carpet so that at most a thin resin layer with integral ridges is formed on the underside of the carpet.

4. An injection mold unit for the injection molding of an edged carpet mat base and for the bonding of the mat base to the carpet in situ in the mold unit, comprising:
    (a) first and second mating molds defining a carpet-accomodating cavity at the parting line thereof for receiving a carpet;
    (b) an edge-forming cavity for receiving liquid resin to form the mat edge surrounding the carpet-accommodating cavity and divided therefrom by a peripheral ridge extending between the cavities for preventing liquid resin injected into the edge-forming cavity from entering the carpet-accommodating cavity; and
    (c) a plurality of grooves for receiving liquid resin to form the mat base communicating with the carpet-accomodating and edge-forming cavities and extending between opposite sides of the edge-forming cavity along the carpet accomodating cavity;

The carpet-accomodating cavity being of a depth sufficient to cause the lands of the grooves to compress a carpet within the carpet accommodating cavity so that a mat base comprising a resin layer of the desired thickness with integral ridges is formed.

* * * * *